March 10, 1925.
W. JOHNSON
WHEEL HOLDER
Filed Aug. 13, 1924
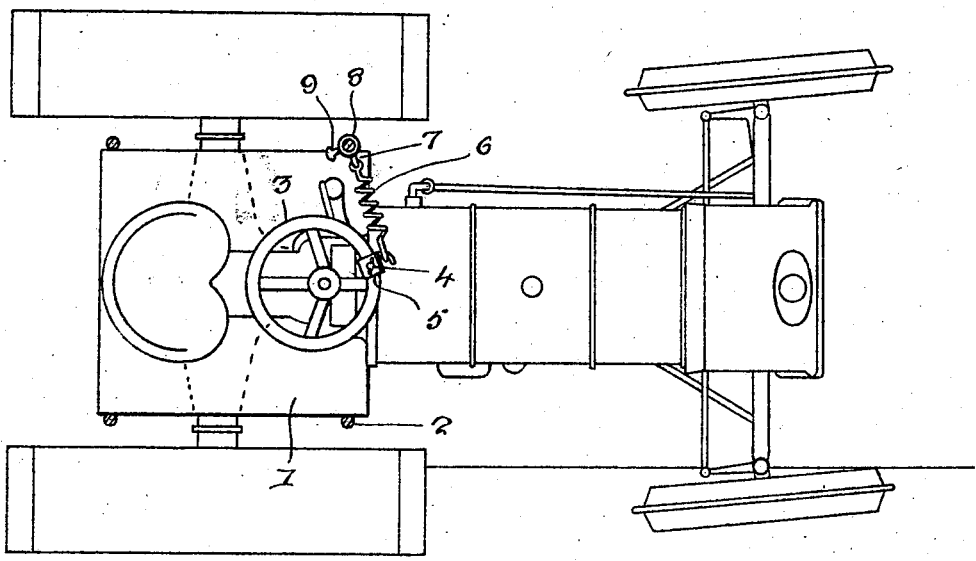
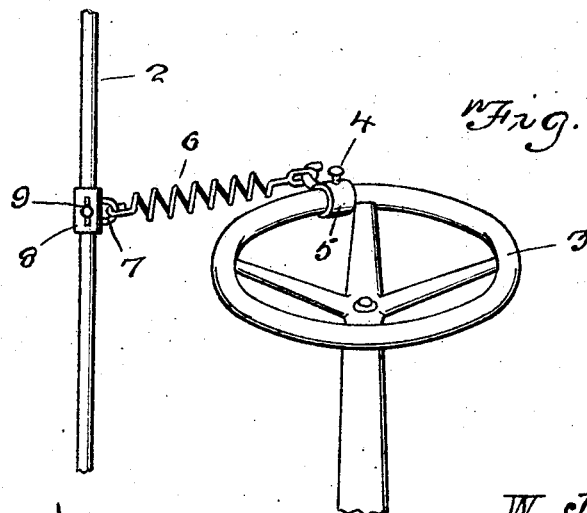

Patented Mar. 10, 1925.

1,529,595

UNITED STATES PATENT OFFICE.

WILLIAM JOHNSON, OF GLENFIELD, NORTH DAKOTA.

WHEEL HOLDER.

Application filed August 13, 1924. Serial No. 731,847.

*To all whom it may concern:*

Be it known that I, WILLIAM JOHNSON, a citizen of the United States, residing at Glenfield, in the county of Foster and State of North Dakota, have invented new and useful Improvements in Wheel Holders, of which the following is a specification.

The object is the provision of simple means connected with the steering wheel of a plow tractor whereby the guide wheels of the tractor will be sustained in one position during the plowing operation without necessitating the guiding of the tractor by the operator.

To the attainment of the foregoing, the invention consists in the improvement as hereinafter described and definitely claimed.

In the drawings:—

Figure 1 is a top plan view of a tractor illustrating the application of my improvement thereon.

Figure 2 is a perspective view to more clearly illustrate the application of the improvement.

In the showing of the drawing I have arranged on the tractor below the steering wheel and the driver's seat, a platform 1. From adjacent the corners of the platform there arise posts 2 that support a canopy (not shown).

The steering wheel is indicated by the numeral 3, and the same has adjustably clamped thereon by means 4 a hook carrying member 5. Secured to the hook on the member 5 there is one end of a helical spring 6. The second end of the spring engages in an eye 7 formed on an adjustable sleeve 8 that is arranged on one of the posts or standards 2. Binding means 9 hold the sleeve 8 adjusted.

My improvement is of an extremely simple construction and may be attached to any ordinary tractor. The spring is tensioned so that the guide wheels of the tractor will be brought to contact with the walls in a previously made furrow so that the tractor will be thus effectively guided over the field without the aid of the operator. It is, of course, obvious that the spring 6 may be tensioned to hold the forward wheels of the tractor straight or in alignment with the rear wheels thereof.

It is thought that the foregoing description, when taken in connection with the drawing, will fully set forth my improvement to those skilled in the art to which such inventions relate.

Having described the invention, I claim:—

The combination with the steering wheel of a tractor and an upright arranged at one side of the steering wheel, of a hook carrying member adjustably secured on the rim of the wheel, a slidable sleeve adjustably secured on the upright, and a helical spring having its ends secured respectively to the hook and to the sleeve.

In testimony whereof I affix my signature.

WILLIAM JOHNSON.